US012783321B2

(12) United States Patent
Li

(10) Patent No.: US 12,783,321 B2
(45) Date of Patent: Nov. 3, 2026

(54) DETECTION AND DISTRIBUTION OF HEAVYWEIGHT REQUESTS

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 349 days.

(21) Appl. No.: 18/653,093

(22) Filed: May 2, 2024

(65) Prior Publication Data

US 2025/0342065 A1 Nov. 6, 2025

(51) Int. Cl.
*G06F 9/50* (2006.01)

(52) U.S. Cl.
CPC .................................. *G06F 9/5055* (2013.01)

(58) Field of Classification Search
None
See application file for complete search history.

(56) References Cited

U.S. PATENT DOCUMENTS

| | | | | |
|---|---|---|---|---|
| 10,958,521 | B2 * | 3/2021 | Sondur | G06F 11/3452 |
| 11,122,145 | B2 * | 9/2021 | Goudarzi | G06F 11/3447 |
| 11,665,110 | B1 * | 5/2023 | Jindal | H04L 47/746 709/226 |
| 11,789,782 | B2 * | 10/2023 | Akinapelli | G06F 9/5027 709/226 |
| 2021/0081409 | A1 * | 3/2021 | Rath | G06F 16/2282 |
| 2023/0099475 | A1 * | 3/2023 | Bhargava | G06F 16/245 707/770 |
| 2023/0108553 | A1 * | 4/2023 | Brooks | G06F 16/285 718/101 |
| 2023/0125661 | A1 * | 4/2023 | Jebakumar | G06F 9/4856 718/1 |
| 2024/0187493 | A1 * | 6/2024 | Kairali | H04L 67/51 |
| 2025/0077325 | A1 * | 3/2025 | Gao | G06F 9/466 |
| 2025/0199866 | A1 * | 6/2025 | Rushton | G06F 9/5027 |

FOREIGN PATENT DOCUMENTS

| | | | | |
|---|---|---|---|---|
| WO | WO-2005065261 A2 * | 7/2005 | | H04L 67/00 |
| WO | WO-2020214408 A1 * | 10/2020 | | G06F 3/061 |

* cited by examiner

*Primary Examiner* — Charles E Anya
(74) *Attorney, Agent, or Firm* — Buckley, Maschoff & Talwalkar LLC

(57) ABSTRACT

Systems and methods provide reception of a request to an application, determination of values of request characteristics based on the request, and determination that the request is a heavyweight request based on the values of the request characteristics. In response to determining that the request is a heavyweight request, execution environments capable of executing the application are determined, operational metric values of one of the execution environments are determined, and it is predicted that the request will not timeout at the one execution environment based on the values of the request characteristics and the operational metric values. In response to predicting that the request will not timeout at the one execution environment, the request is sent to the one execution environment.

18 Claims, 9 Drawing Sheets

300

310 320 330

| Request part | Value | Explanation |
|---|---|---|
| main entity name | Entity1 | the entity to query |
| $select | field1,field2,...,field20 | the fields to return in the response |
| $expand | entity2Nav/entity3Nav, entity4Nav/entity5Nav/entity6Nav | the navigation entities to query |
| $filter | (field1 eq 'ABC') and (entity2Nav/field11 eq 123 or entity4Nav/entity5Nav/field12 eq 456) | the filter condition of the query |
| $orderby | field3 asc, entity2Nav/field13 desc | the order condition of the query |
| pagesize | 1000 | the page size of the query is 1000 |

*FIG. 3*

400

| Request Characteristic | Explanation |
|---|---|
| $QC_{table}$ | table count that the entity is mapping to. If one entity mapping to multiple tables, it usually needs table join. |
| $QC_{select}$ | field count in the $select clause |
| $QC_{bytes}$ | byte array field count in the $select clause, which is mapping to BLOB/CLOB columns of the database table and costs much more times than ordinary fields |
| $QC_{expand}$ | the expand item count in the $expand clause. Expand needs more queries. |
| $QD_{expand}$ | total expand depth in the $expand clause. Expand needs more queries. |
| $QC_{filter}$ | or/and clause count in the $filter expression |
| $QD_{filter}$ | the total depth of deep property in the $filter clause. Deep property needs table join. |
| $QC_{order}$ | item count in the $orderby clause |
| $QD_{order}$ | the total depth of deep property in the $order clause. Deep property needs table join. |
| $Q_{page}$ | the page size of the request |

FIG. 4

500

| Metric | Explanation | Example value |
|---|---|---|
| $Op_{CPU}$ | CPU Usage at Request Time | 60% |
| $Op_{mem}$ | Memory Usage at Request Time | 60% |
| $Op_{load}$ | System Load at Request Time | 15 |
| $Op_{thread}$ | Active Thread Count at Request Time | 100 |
| $Op_{dbconn}$ | Running Database Connection Count at Request Time | 10 |

FIG. 5

DETECTION AND DISTRIBUTION OF HEAVYWEIGHT REQUESTS

BACKGROUND

Software applications have been increasingly migrated to the cloud in order to take advantage of the resource elasticity, redundancy, economies of scale and other benefits provided thereby. An application executing in a cloud environment may be used by many users and/or tenants simultaneously. Each of these users/tenants shares the computing resources (e.g., CPU, memory, and network bandwidth) which are used to execute the application in the cloud environment. Heavy usage of the application by one user may negatively impact usage of the application by another user.

Occasionally, an application receives a request from a gateway and, while formulating a response to the request, a timeout threshold of the gateway or other network component is exceeded. Such "heavyweight" requests therefore cause a user to wait for an extended period, only to receive a timeout error at the end of the extended period. Moreover, the application may continue to work on the request even after the error is returned to the user, needlessly consuming valuable computing resources. Heavyweight requests may therefore reduce the efficiency of the user and also inefficiently deprive other users' requests of computing resources.

Systems are desired to reduce the negative impact of heavyweight requests on cloud-based applications.

BRIEF DESCRIPTION OF THE DRAWINGS

FIG. 3 is a table describing parts of a request according to some embodiments.

FIG. 4 is a table describing request characteristics according to some embodiments.

FIG. 5 is a table describing operational metrics according to some embodiments.

DETAILED DESCRIPTION

The following description is provided to enable any person in the art to make and use the described embodiments. Various modifications, however, will remain readily-apparent to those in the art.

Some embodiments facilitate detection and distribution of heavyweight requests to a redundantly-available application. Initially, a received request is evaluated to determine if it is a heavyweight request. The evaluation may consider the request and metadata of application entities which are associated with the request. If the request is not a heavyweight request, conventional protocols are employed to determine an environment (e.g., a physical server, a virtual server) hosting the application and to distribute the request to the environment.

If the received request is deemed a heavyweight request, an attempt is made to determine whether processing of the request will not timeout at an execution environment of the application. The identification is based on the request, the metadata of application entities which are associated with the request, and contemporaneous operational metrics of the execution environment. If it is determined that the request will not timeout at the execution environment, the request is distributed to the execution environment. If it is determined that the request will timeout at the execution environment, the determination is repeated with respect to another execution environment of the application request. If no execution environment is identified at which the request will not timeout, the request is rejected, thereby avoiding subsequent inefficient usage of computing resources.

According to some embodiments, a model is generated to determine whether a given request will timeout at a given execution environment. The model is generated based on historical requests, metadata of application entities which are associated with the requests, contemporaneous operational metrics and indications of whether the historical requests timed out.

Figure 1:
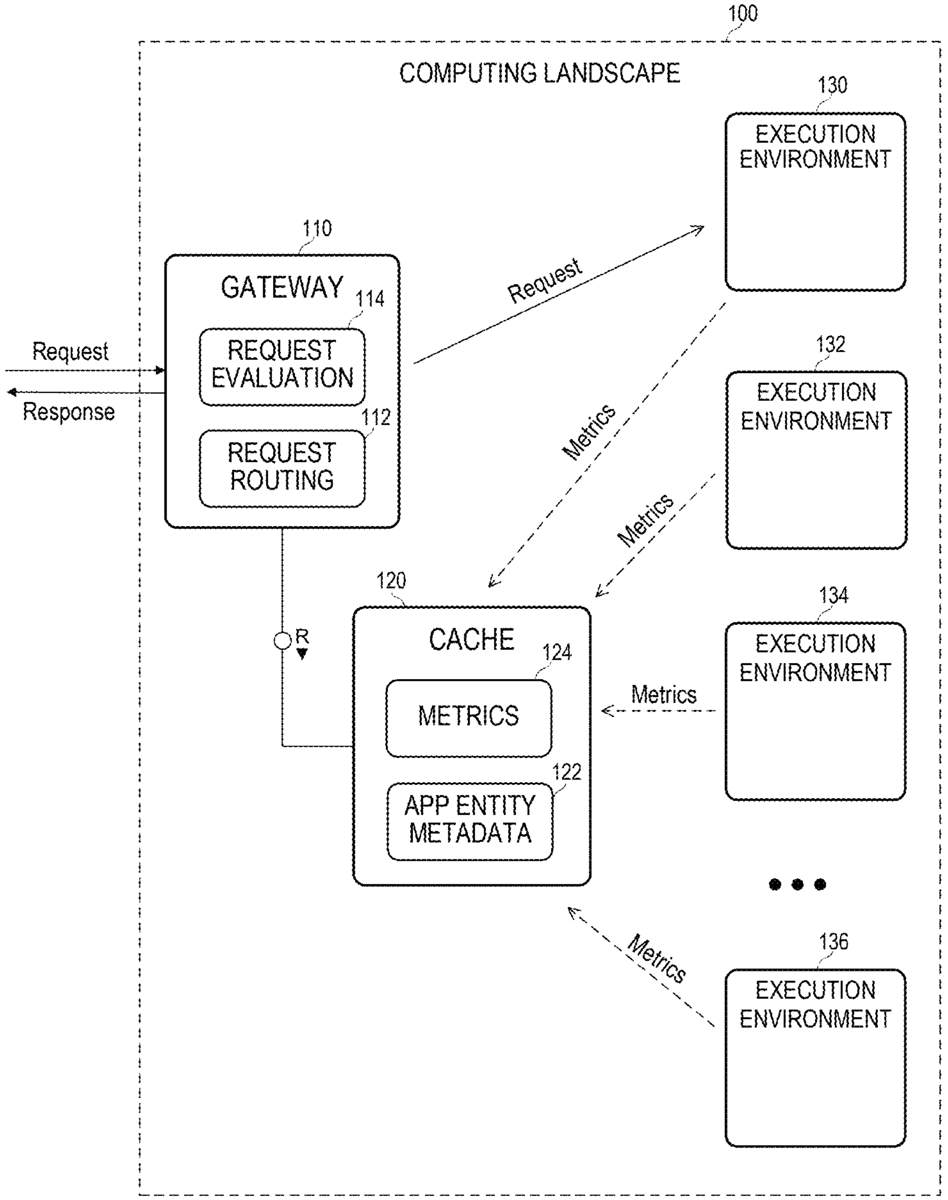
FIG. 1 illustrates a cloud-based computing landscape including redundant execution environments according to some embodiments.

FIG. 1 illustrates a system according to some embodiments. The illustrated components of FIG. 1 may be implemented using any suitable combinations of computing hardware and/or software that are or become known. Such combinations may include on-premise servers, cloud-based servers, and/or elastically-allocated virtual machines. In some embodiments, two or more components are implemented by a single computing device.

Computing landscape 100 may comprise any number of hardware and software components which may provide functionality to one or more users (not shown). In the present example, computing landscape 100 includes gateway 110 for routing incoming requests associated with one or more applications, as well as authentication, authorization, and load balancing. Gateway 110 includes request routing component 112 which determines an endpoint to which an incoming request should be forwarded. For example, upon receiving an incoming request for services of an application, request routing component 112 may determine the application or applications that can process the request, a set of execution environments which could potentially execute the application or applications, and one of the execution environments to which the request should be forwarded. It should be noted that some requests can be processed by a single application while other requests will require multiple applications either processing in parallel or in series. In such cases, determination of the impact on an individual execution environment may require data from one or more applications within the execution environment.

Gateway 110 uses request evaluation component 114 to determine whether an incoming request requires special consideration by request routing component 112 and whether the incoming request may timeout at a given execution environment. Cache 120 is accessible to gateway 110 and stores metadata 122 related to application entities (e.g., database tables, objects) and operational metrics 124 of application execution environments. Cache 120 may comprise a key-value in-memory database, such as but not limited to a Redis cluster.

As will be described below, gateway 110 may execute request evaluation component 114 to identify an incoming request as a heavyweight request based on parts of the request and on metadata 122 of the application entities associated with the request. Request evaluation component 114 may also in some embodiments predict whether an identified heavyweight request will timeout at a given execution environment based on the parts of the request, the metadata 122, and operational metrics 124 of the given execution environment.

Each execution environment 130-136 of computing landscape 100 executes the same application. It should be noted that additional execution environments (not shown) may also be included in computing landscape 100 that may execute different applications. For computing landscape 100, each execution environment 130-136 is capable of serving at least one common request received by gateway 110. An execution environment according to some embodiments may comprise one or more physical servers and/or virtual servers executing a monolithic or microservice-based application. According to some embodiments, an execution environment may comprise a container executing in a node of a container orchestration system such as Kubernetes. Some execution environments are capable of executing a plurality of varied applications and need not necessarily limited to executing a single application.

As illustrated in FIG. 1, each of execution environments 130-136 provides values of operational metrics to cache 120 for storage within metrics 124. The operational metrics may relate to resource consumption, performance, etc. of execution environments 130-136. For example, the metrics 124 may comprise CPU usage, memory usage, system load, and number of active requests. The metric values may be provided with a timestamp in order to determine the most recent metric value and/or to associate metric values with particular incoming requests.

Execution environments 130-136 may include their own respective metric monitoring components and provide metric values to cache 120 on a schedule, in response to a trigger, in response to a request from cache 120 or another component, etc. Each execution environment 130-136 may provide metric values to cache 120 in different manners. According to some embodiments, computing landscape 100 includes a separate monitoring component for determining metric values associated with one or more of execution environments 130-136 and for providing those values to cache 120. For example, the execution environments 130-136 may expose endpoints (e.g., HTTP endpoints) from which a monitoring component scrapes metrics values.

Request evaluation component 114 may predict whether a request will timeout at a given execution environment based on parts of the request, application entity metadata 122 associated with the parts of the request, and most-recent operational metrics 124 of the given execution environment. Historical operational metrics 124 of the given execution environment may be used by a processor to generate predictions or, alternatively, used to generate an algorithm to perform the prediction. Some embodiments of this generation are described below.

Figure 2:
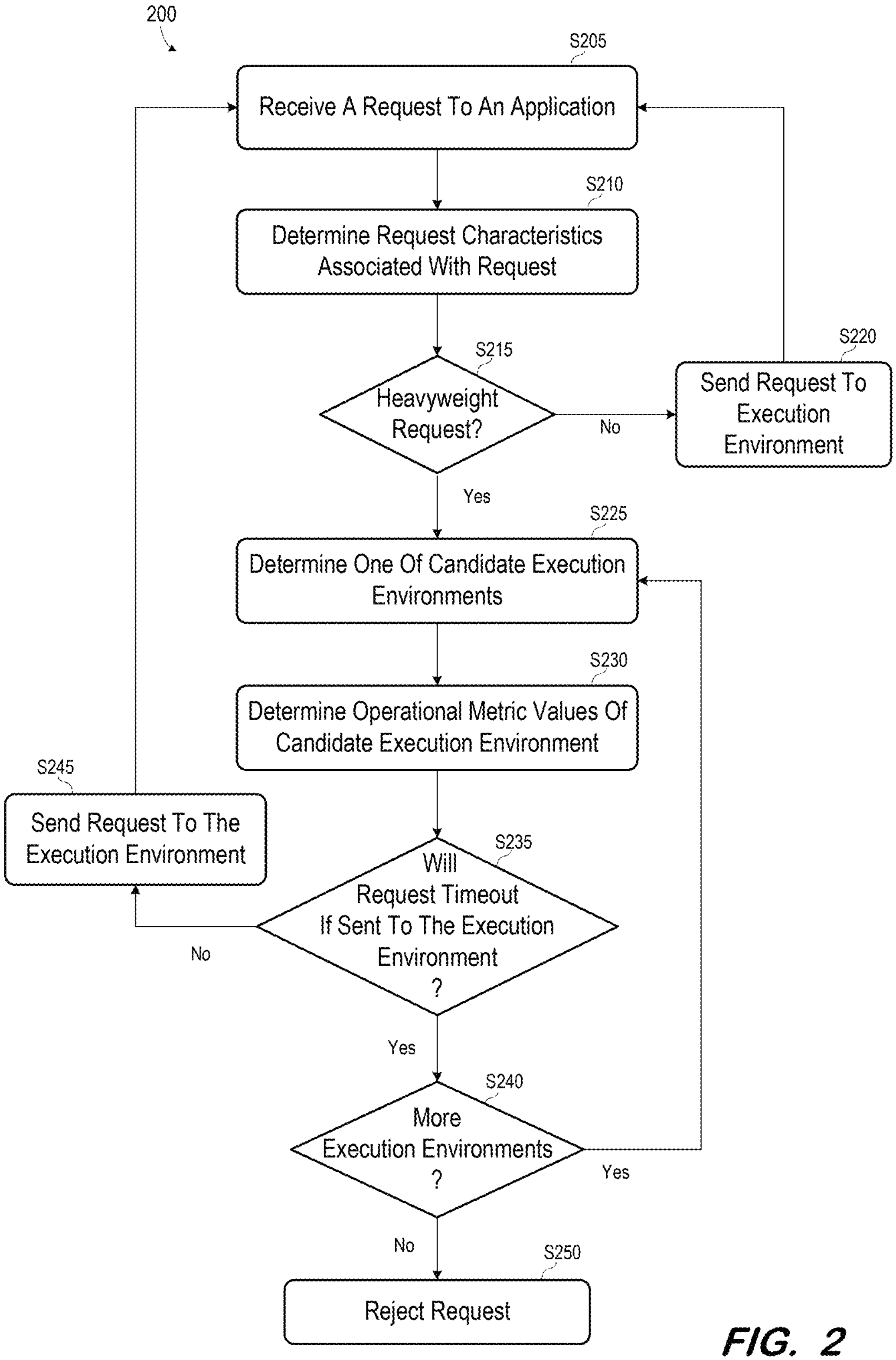
FIG. 2 is a flow diagram of a process to detect and distribute heavyweight requests according to some embodiments.

FIG. 2 is a flow diagram of process 200 to detect and distribute heavyweight requests according to some embodiments. Process 200 and the other processes described herein may be performed using any suitable combination of hardware and software. Software program code embodying these processes may be stored by any non-transitory tangible medium, including a fixed disk, a volatile or non-volatile random-access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S205, an external request associated with an application is received. In one example, a user may operate a client device (e.g., a desktop computer) to execute a Web browser application. The user may select or otherwise input a Uniform Resource Locator (URL) associated with a cloud-based application, causing the Web browser to send a request to a cloud gateway corresponding to the URL. As mentioned above, the gateway may perform authentication and authorization prior to proceeding to S210.

At S210, values of requests characteristics are determined. The determinations at S210 may be based on parts of the received request and/or on application entity metadata associated with parts of the request. For purposes of the present example of S210, it will be assumed that the following request is received at S205:

/Entity
1?$select=field1, field2, . . . , field20&$expand=entity2Nav/entity3Nav, entity4Nav/entity5Nav/entity6Nav&$filter=(field1 eq 'abc') and (entity2Nav/field11 eq 123 or entity4Nav/entity5Nav/field12 eq 456) &$orderby=field2 asc, entity2Nav/field13 desc&pagesize=1000

FIG. 3 shows table 300 describing various parts of the above request according to some embodiments. Table 300 shows request parts in column 310, the values associated with each request part in column 320 and, for ease of explanation but not necessary, an explanation of the request parts of column 310 in column 330. In this manner, table 300 associates each request part of the received request with its corresponding value and with an explanation thereof.

Table 400 of FIG. 4 describes request characteristics according to some embodiments. Values corresponding to one or more of the request characteristics of table 400 may be determined at S210 based on the request parts of the received request and on metadata of application entities which are associated with the request parts. For example, to determine the value of request characteristic $QC_{table}$, application entity metadata is retrieved (e.g., from cache 120) to determine a number of tables to which the requested entity maps. In another example, determination of a value of request characteristic $QC_{bytes}$ requires application metadata indicating a number of byte array fields of the $select clause of the request. Accordingly, the values of $QC_{table}$ and $QC_{bytes}$ determined for an incoming request to a first application may differ from the values determined for the same incoming request to a second application due to differences in the application entity metadata of the first and second applications. The values of some request characteristics (e.g., $QC_{select}$, $QC_{expand}$, $QC_{expand}$, $Q_{page}$) of table 400 may be determined from the request parts alone, without referring to application entity metadata.

At S215, it is determined whether the received request is a heavyweight request. A heavyweight request is a request that is expected to possibly burden the resources of an execution environment to an unsuitable degree. The possible burden may include, but is not limited to, excessive processing time, excessive bandwidth usage, and excessive CPU usage. In some embodiments, a heavyweight request is a request whose processing time is expected to possibly exceed the timeout period of a network component (e.g., a gateway).

The determination of whether the request is a heavyweight request may be performed based on the values of one or more request characteristics. For example:

heavyweight =

$$\begin{cases} \text{true}, & \text{if } QC_{table} + QC_{bytes} + QD_{expand} + QD_{filter} + QD_{order} > N_h \\ \text{false}, & \text{other} \end{cases}$$

where value of threshold $N_h$ can be adjusted. In some examples, $N_h$=4. Embodiments are not limited to the foregoing formula or variables. In some embodiments, S215 is omitted and the other steps of process 200 are performed for all incoming requests.

If the request is determined at S215 to not constitute a heavyweight request, flow proceeds to S220 to select and send the request to an execution environment. The execution environment to which the request is sent may be selected using any known protocol. For example, a gateway which received the request may identify a set of execution environments capable of serving the request from stored routing information. The gateway may perform a round-robin selection of one of these execution environments at S220 as is known in art. As has been described with respect to S215, the determination of a request being a heavyweight request may comprise a preliminary, and not a necessarily a required, determination such that even if a request is determined to be a heavyweight request at S215, further processing may be needed to determine if one or more particular execution environments 130, 132, 134 or 136 are capable of processing the request before a timeout condition is raised.

Flow proceeds from S215 to S225 to determine a candidate execution environment. The candidate execution environment may be one of a set of execution environments capable of serving the request. An execution environment may be deemed capable of serving the request if it executes the application to which the request is directed, if it includes the requested data, if the requestor is authorized to access the execution environment, etc. The set of execution environments capable of serving the request may be determined from stored routing information.

Operational metric values of the candidate execution environment are determined at S230. The determined operational metric values may be those associated with a most recent timestamp in metrics 124 of cache 120. The operational metric values may be determined directly from the execution environment. Table 500 of FIG. 5 describes operational metrics of an execution environment which may be determined at S230 according to some embodiments. Embodiments are not limited to the operational metrics of table 500 or to the units of the example values shown therein.

At S235, it is determined whether the request will timeout if sent to the execution environment. The determination at S235 may be based on the request parts, on the determined values of request characteristics and/or on application entity metadata, and on operational metric values of the candidate execution environment. The determination at S235 may employ any algorithm, formula, set of equations, decision tree, random forest, network of interconnected weighted nodes, or other implementation of a classification function that is or becomes known. According to some embodiments, the request characteristics of table 400 and the operational metrics of table 500 are the inputs to the determination at S235.

If, at S235, it is predicted that the request will timeout if sent to the candidate execution environment, flow proceeds to S240 to determine whether additional candidate execution environments for receiving the request exist. If so, flow returns to S225. A next candidate execution environment is determined at S225 and values of its operational metrics are determined at S230. Flow then continues as described above to determine whether the request will timeout if sent to the next candidate execution environment. This determination at S235 is based on the request parts and on the values of request characteristics used during the prior iteration of S235, but also on the operational metric values of the next candidate execution environment.

If it is predicted that the request will not timeout at the next candidate execution environment, the request is sent to the next candidate execution environment at S245. Flow then returns to S205 to await a next request. If flow reaches S240 and is it determined that no additional candidate execution environments for receiving the request exist, the request is rejected at S250. According to some embodiments, the rejection includes a suggestion to simplify the request or to change the request to a background scheduling job.

Process 200 may be used to manage incoming requests to more than one application. If more than one application is contemplated, S210 includes determination of request characteristic values based on entity metadata of the specific application to which the request is directed, and the candidate execution environments are those which are capable of executing the specific application. Moreover, the classification function used at S235 may be specific to the application of the request. In this regard, the training data used to generate the classification function for an application may be based on historical requests to the application, metric values resulting from serving requests to the application, and data indicating whether or not such requests timed out.

Figure 6:
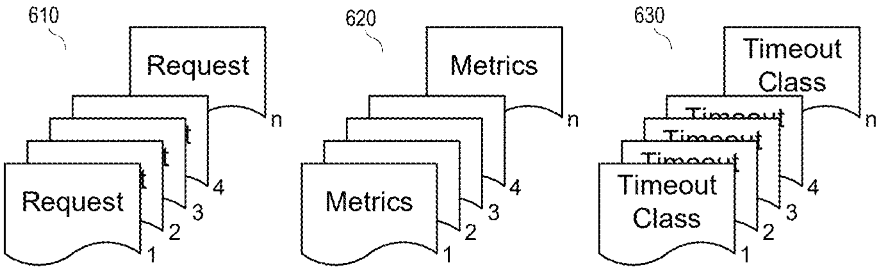
FIG. 6 illustrates data collected for training of a network according to some embodiments.

FIG. 6 illustrates data collected for training of a classification network according to some embodiments. The trained classification network may be used to perform a prediction at S235 of process 200.

Requests 610 comprise N requests to a particular application. Each of requests 610 may comprise values for each of several parts of a request as shown in table 300. Each of N metrics 620 comprises a set of metric values which represent operation of an execution environment at a time contemporaneous with reception of a corresponding request. That is, $\text{Metrics}_1$ represent the operation of an execution environment at a time contemporaneous with reception of $\text{Request}_1$. Timeout classes 630 represent whether a corresponding request 610 timed out at an execution environment associated with corresponding metrics 620. Timeout $\text{class}_1$ therefore represents whether Request timed out at the execution environment associated with $\text{Metrics}_1$.

The FIG. 6 data may be collected during development, testing, and or productive use of an application deployed to one or more execution environments. Embodiments include intentional curation of heavyweight requests 630 using complex expressions to generate corresponding metrics 620 and a timeout class 630.

According to some embodiments, the value of a timeout class 630 is 1 if request timed out, and 0 if the request did not time out. It is expected that in the historical data more timeout classes are assigned a value of 0 than a value of 1. In some embodiment, the FIG. 6 training data is sampled such that the number of requests 610 and metrics 620 which are associated with a timeout class of 0 is roughly equal to the number of requests 610 and metrics 620 which are associated with a timeout class of 1.

The thusly-sampled historical data, may be split into a training data set, a validation data set and a testing data set.

According to some embodiments, the values of all input variables in the training set are normalized to the range [0, 1] by the following:

$$v_{normalized} = \frac{v - \min(v)}{\max(v) - \min(v)}$$

where min (v) and max (v) calculate the minimum/maximum values of input variable v in the training set.

Figure 7:
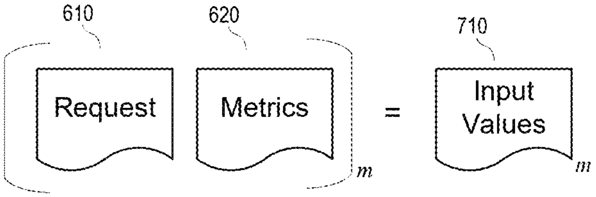
FIG. 7 illustrates generation of sets of input values of network training data according to some embodiments.

FIG. 7 illustrates generation of M sets of input values 710 of network training data according to some embodiments. The M sets of input values 710 may be split into a training data set, a validation data set and a test data set as described above. Each set of input values 710 is determined based on values of a request 610 and values of corresponding metrics 620. Each of input values 710 may comprise a string of normalized values of a request 610 and corresponding metrics 620. For example, in some embodiments, each instance of input values 710 is a vector including normalized values:

$$[QC_{table}, QC_{select}, QC_{bytes}, QC_{expand}, QD_{expand}, QC_{filter}, QD_{filter}, QC_{order}, QD_{order}, Q_{page}, APP_{cpu}, APP_{mem}, APP_{load}, APP_{thread}, APP_{dbcon}]$$

Figure 8:
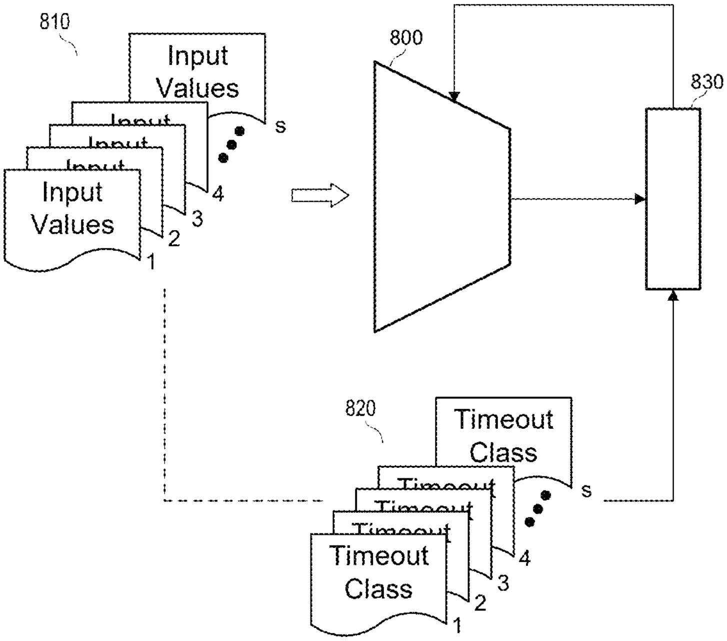
FIG. 8 illustrates training of a network according to some embodiments.

FIG. 8 illustrates training of network 800 according to some embodiments. Network 800 may comprise a network of neurons which receive input, change internal state according to that input, and produce output depending on the input and internal state. The output of certain neurons is connected to the input of other neurons to form a directed and weighted graph. The weights as well as the functions that compute the internal states are iteratively modified during training using supervised learning algorithms as is known. The structure of network 800 may include convolutional layers and may be designed to infer a likelihood that a request to an application executing within an execution environment will time out.

Network 800 is trained using S instances of input values 810, representing a training data set. Each of input values 810 is associated with a respective one of timeout classes 820 as described above. The timeout class 820 associated with an instance of input values 810 indicates whether the request associated with the instance timed out.

Generally, training comprises inputting a batch of instances 810 into network 800, acquiring resulting classifications output by network 800, using loss layer 830 to compare the output classifications to ground truth classifications 820 corresponding to the input instances 810, modifying network 800 based on the comparison, and continuing in this manner until the difference between the output classifications of a test set of input instances (not shown) and the ground truth classifications of the test set (i.e., the network loss) is satisfactory.

Figure 9:
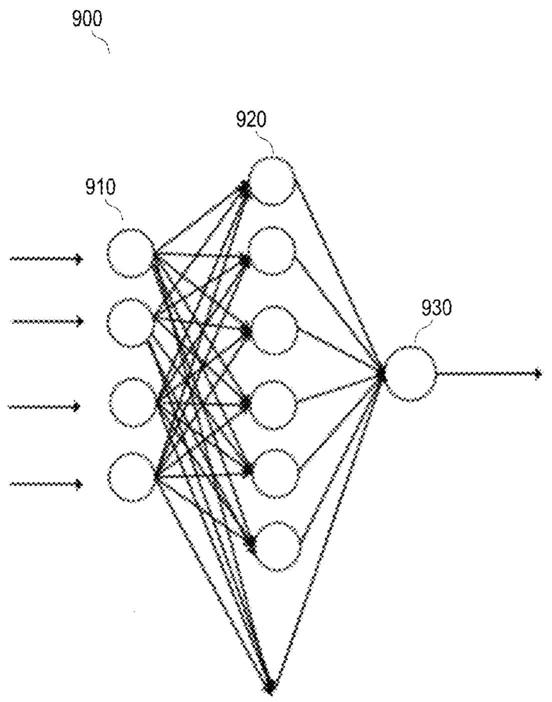
FIG. 9 depicts a network architecture according to some embodiments.

FIG. 9 depicts architecture 900 of a network which may be used as network 800 according to some embodiments. Architecture 900 is a feedforward neural networks including three layers. Input layer 910 includes fifteen nodes, each of which receives a value of one of the above-listed fifteen variables of an input instance 810. Middle layer 920 is a hidden layer including sixty-four nodes, for example. Output layer 930 includes one node which outputs the prediction probability of timeout class=1.

The activation function of the nodes of middle layer 920 may be implemented using the rectified linear unit function:

$$relu(z) = \max(0, z)$$

Output layer 940 may use the sigmoid function as the activation function:

$$\sigma(z) = \frac{1}{1 + e^{-z}}$$

The matrices $W^{(1)}$ and $W^{(2)}$ may be defined as the weight matrices of layer 920 and layer 930, respectively, and the vectors $b^{(1)}$ and $b^{(2)}$ are the bias vectors of layer 920 and layer 930. The output of layer 920 becomes:

$$\alpha^{(1)} = relu\left(W^{(1)}x + b^{(1)}\right)$$

and the output of layer 930 is:

$$\alpha^{(2)} = \sigma\left(W^{(2)}\alpha^{(1)} + b^{(2)}\right).$$

a is defined as the norm of $\alpha^{(2)}$ as $$a = \|a^{(2)}\|$$

The prediction value of label timeout depends on a as:

$$\widetilde{timeout} = \begin{cases} 1, & \text{if } a \geq 0.5 \\ 0, & \text{other} \end{cases}$$

Training of architecture 900 may use stochastic gradient descent as the optimizer and the binary cross entropy as the loss function. Regularization may be used to address overfitting. The loss function with regularization is:

$$L = -\frac{1}{N}\sum_{i=1}^{N}(y_i \cdot \log(a_i) + (1 - y_i) \cdot \log(1 - a_i)) + \frac{\lambda}{2N}\sum w^2$$

where N is the size of the training data set, $y_i$ is the label of the output, $a_i$ is the norm of output value of the last output layer, $\Sigma w^2$ is the sum of squares of all the weights, and λ is an adjustable parameter of regularization. λ may be initially set to 0. After training is complete, the values of $W^{(1)}$, $W^{(2)}$, $b^{(1)}$ and $b^{(2)}$ are extracted for validation.

For example, the accuracy of prediction is determined based on the training data set and the validation data set. If the accuracy is not sufficient, the node count of layer 920 and/or the regularization parameter λ may be adjusted and training is performed again. After achieving suitable prediction accuracy with respect to the training data set and the validation data set, the accuracy of prediction is determined based on the test data set.

Training causes a network to learn relationships in the input instances that are indicative of successful or timed out requests. The trained network may be deployed into a gateway, for example, using a set of linear equations, executable program code, a set of hyperparameters defining a model structure and a set of corresponding weights, or any other representation of the mapping of input to output which was learned as a result of the training. The deployed trained network can then be used at S235 to predict whether a request will timeout if sent to an execution environment. In particular, normalized values of request characteristics and of current metrics of the execution environment may be input into the trained network at S235 to generate the prediction.

Figure 10:
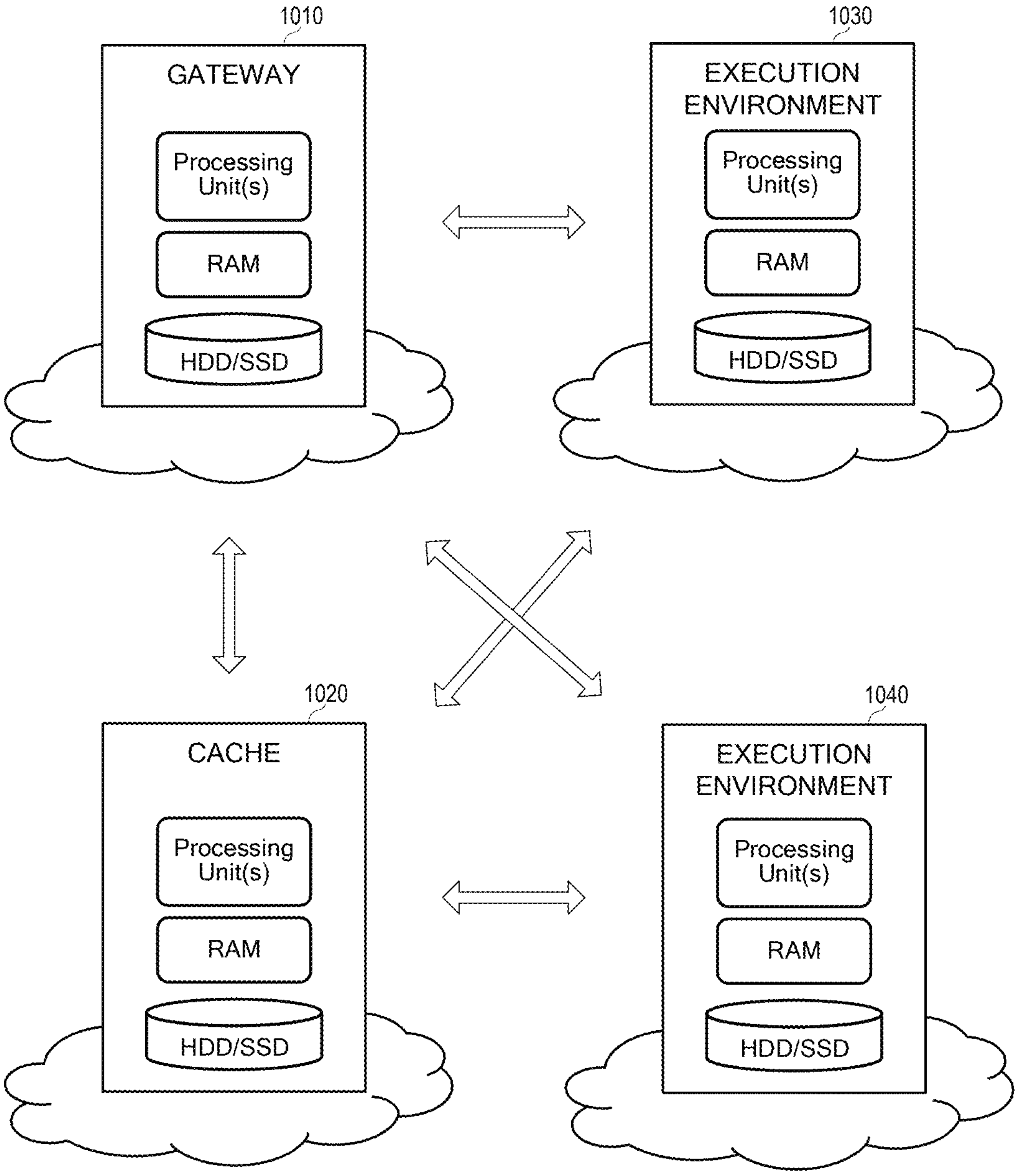
FIG. 10 illustrates a cloud-based architecture according to some embodiments.

FIG. 10 illustrates a cloud-based architecture according to some embodiments. The illustrated components may comprise cloud-based compute resources residing in one or more public clouds providing self-service and immediate provisioning, autoscaling, security, compliance and identity management features.

Components 1010-1040 may comprise physical servers or virtual machines supporting containerized applications which provide one or more services to users. Execution environments 1030 and 1040 may execute an application as described herein. Execution environments 1010 and 1020 may execute a gateway and a cache, respectively, as also described herein.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
memory storing program code; and
at least one processing unit to execute the program code to cause the system to:
receive a request to an application;
determine values of request characteristics based on the request;
determine that the request is a heavyweight request based on the values of the request characteristics; and
in response to the determination that the request is a heavyweight request:
determine a first execution environment capable of executing the application;
determine operational metric values of the first execution environment; and
predict that the request will timeout at the first execution environment based on the values of the request characteristics and the operational metric values;
in response to the prediction that the request will timeout at the first execution environment:
determine a second execution environment capable of executing the application;
determine second operational metric values of the second execution environment; and
predict that the request will not timeout at the second execution environment based on the values of the request characteristics and the second operational metric values; and
in response to the prediction that the request will not timeout at the second execution environment, send the request to the second execution environment.

2. The system of claim 1, wherein the prediction that the request will timeout at the first execution environment is further based on the request and on metadata of entities of the application which are associated with the request.

3. The system of claim 1, the at least one processing unit to execute the program code to cause the system to:
receive a second request to the application;
determine second values of the request characteristics based on the second request;
determine that the second request is a not heavyweight request based on the second values of the request characteristics; and
in response to the determination that the second request is not a heavyweight request, send the second request to the first execution environment without predicting whether the second request will timeout at the first execution environment.

4. The system of claim 1, the at least one processing unit to execute the program code to cause the system to:
receive a second request to the application;
determine second values of the request characteristics based on the second request;
determine second operational metric values of the first execution environment;
predict that the second request will not timeout at the first execution environment based on the values of the second request characteristics and the second operational metric values; and
in response to the prediction that the second request will not timeout at the first execution environment, send the second request to the first execution environment.

5. The system of claim 1, the at least one processing unit to execute the program code to cause the system to:
receive a second request to the application;
determine second values of the request characteristics based on the second request;
determine third operational metric values of a third execution environment executing the application;
predict that the second request will not timeout at the third execution environment based on the values of the second request characteristics and the third operational metric values; and
in response to the prediction that the second request will not timeout at the third execution environment, send the second request to the third execution environment.

6. The system of claim 1, the at least one processing unit to execute the program code to cause the system to:

receive a second request to a second application;
determine second values of the request characteristics based on the second request;
determine a third execution environment executing the second application;
determine third operational metric values of the third execution environment;
predict that the second request will not timeout at the third execution environment based on the second values of the request characteristics and the third operational metric values; and
in response to predicting that the second request will not timeout at the third execution environment, send the second request to the third execution environment.

7. A method comprising:
receiving a request to an application;
determining values of request characteristics based on the request;
determining that the request is a heavyweight request based on the values of the request characteristics; and
in response to determining that the request is a heavyweight request:
determining execution environments capable of executing the application;
determining operational metric values of a first one of the execution environments;
predicting that the request will not timeout at the first one of the execution environments based on the values of the request characteristics and the operational metric values; and
in response to predicting that the request will timeout at the first one of the execution environments:
determining second operational metric values of a second one of the execution environments; and
predicting that the request will not timeout at the second one of the execution environments based on the values of the request characteristics and the second operational metric values; and
in response to predicting that the request will not timeout at the second one of the execution environments, sending the request to the second one of the execution environments.

8. The method of claim 7, comprising:
receiving a second request to the application;
determining second values of the request characteristics based on the second request;
determining that the second request is a heavyweight request based on the second values of the request characteristics; and
in response to determining that the second request is a heavyweight request:
determining third operational metric values of a third one of the execution environments;
predicting that the second request will timeout at the third one of the execution environments based on the second values of the request characteristics and the third operational metric values; and
in response to predicting that the second request will timeout at the third one of the execution environments, rejecting the second request.

9. The method of claim 7, wherein the predicting that the request will not timeout at the second one of the execution environments is further based on the request and on metadata of entities of the application which are associated with the request.

10. The method of claim 7, further comprising:
receiving a second request to the application;
determining second values of the request characteristics based on the second request;
determining that the second request is not a heavyweight request based on the second values of the request characteristics; and
in response to determining that the second request is not a heavyweight request, sending the second request to the first one of the execution environments without predicting whether the second request will timeout at the first one of the execution environments.

11. The method of claim 7, further comprising:
receiving a second request to the application;
determining second values of the request characteristics based on the second request;
determining that the second request is a heavyweight request based on the values of the second request characteristics; and
in response to determining that the second request is a heavyweight request:
determining third operational metric values of a third one of the execution environments;
predicting that the second request will not timeout at the third one of the execution environments based on the second values of the request characteristics and the third operational metric values; and
in response to predicting that the second request will not timeout at the third one of the execution environments, sending the second request to the third one of the execution environments.

12. The method of claim 7, further comprising:
receiving a second request to the application;
determining second values of the request characteristics based on the second request;
determining that the second request is a heavyweight request based on the values of the second request characteristics; and
in response to determining that the second request is a heavyweight request:
determining third operational metric values of the first one of the execution environments;
predicting that the second request will not timeout at the first one of the execution environments based on the second values of the request characteristics and the third operational metric values; and
in response to predicting that the second request will not timeout at the first one of the execution environments, sending the second request to the first one of the execution environments.

13. The method of claim 7, further comprising:
receiving a second request to a second application;
determining second values of the request characteristics based on the second request;
determining that the second request is a heavyweight request based on the values of the second request characteristics; and
in response to determining that the second request is a heavyweight request:
determining second execution environments executing the application;
determining third operational metric values of a first one of the second execution environments;
predicting that the second request will not timeout at the first one of the second execution environments based on the second values of the request characteristics and the third operational metric values; and in response to predicting that the second request will not timeout at the first one of the second execution environments, sending the second request to the first one of the second execution environments.

14. A system comprising:

a plurality of execution environments, each of the plurality of execution environments executing an application;

a cache storing operational metric values of each of the plurality of execution environments; and a gateway comprising:

first memory storing program code; and one or more processing units to execute the program code to cause the gateway to:

receive a request to the application;

determine values of request characteristics based on the request;

determine that the request is a heavyweight request based on the values of the request characteristics; and in response to the determination that the request is a heavyweight request:

determine a first execution environment of the plurality of execution environments capable of executing the application;

acquire, from the cache, operational metric values of the determined first execution environment; and predict that the request will timeout at the determined first execution environment based on the values of the request characteristics and the operational metric values; and in response to the prediction that the request will timeout at the first execution environment:

determine a second execution environment of the plurality of execution environments capable of executing the application;

determine second operational metric values of the second execution environment;

predict that the request will not timeout at the second execution environment based on the values of the request characteristics and the second operational metric values; and in response to the prediction that the request will not timeout at the second execution environment, send the request to the determined second execution environment.

15. The system of claim 14, the at least one processing unit to execute the program code to cause the gateway to:

acquire, from the cache, metadata of entities of the application which are associated with the request, wherein the prediction that the request will timeout at the determined first execution environment is further based on the request and on the metadata of entities of the application which are associated with the request.

16. The system of claim 14, the at least one processing unit to execute the program code to cause the gateway to:

receive a second request to the application;

determine second values of the request characteristics based on the second request;

determine that the second request is not a heavyweight request based on the second values of the request characteristics; and in response to the determination that the second request is not a heavyweight request, send the second request to one of the plurality of execution environments without predicting whether the second request will timeout at the one of the plurality of execution environments.

17. The system of claim 14, the at least one processing unit to execute the program code to cause the gateway to:

receive a second request to the application;

determine second values of the request characteristics based on the second request;

acquire, from the cache, third operational metric values of a third one of the plurality of execution environments executing the application;

predict that the second request will not timeout at the third one of the plurality of execution environments based on the second values of the second request characteristics and the third operational metric values; and in response to the prediction that the second request will not timeout at the third one of the plurality of execution environments, send the second request to the third one of the plurality of execution environments.

18. The system of claim 14, further comprising:

a second plurality of execution environments, each of the second plurality of execution environments executing a second application, the at least one processing unit to execute the program code to cause the gateway to:

receive a second request to the second application;

determine second values of the request characteristics based on the second request;

determine one of the second plurality of execution environments capable of executing the second application;

determine, from the cache, second operational metric values of the one of the second plurality of execution environments;

predict that the second request will not timeout at the one of the second plurality of execution environments based on the second values of the request characteristics and the second operational metric values; and in response to predicting that the second request will not timeout at the one of the second plurality of execution environments, send the second request to the one of the second plurality of execution environments.

* * * * *